United States Patent [19]

Valier

[11] Patent Number: 4,629,050
[45] Date of Patent: Dec. 16, 1986

[54] MULTIDISK CLUTCH FEATURING IMPROVED LUBRICATION AND COOLING

[75] Inventor: Carlo Valier, Pino Torinese, Italy
[73] Assignee: Valeo, Paris, France
[21] Appl. No.: 680,480
[22] Filed: Dec. 11, 1984

[30] Foreign Application Priority Data

Dec. 27, 1983 [FR] France ............................ 83 20828

[51] Int. Cl.⁴ ............................................ F16D 13/74
[52] U.S. Cl. ............................ 192/113 B; 188/264 B
[58] Field of Search ..................... 192/70.12, 113 B; 188/264 B, 264 D, 71.6; 415/90

[56] References Cited

U.S. PATENT DOCUMENTS

| | | | |
|---|---|---|---|
| 2,775,331 | 12/1956 | Peterson | 192/113 |
| 3,351,169 | 11/1967 | McIndoe | 192/113 B |
| 4,134,483 | 1/1979 | Horsch | 192/113 |
| 4,413,716 | 11/1983 | Newsome et al. | 192/70.12 |
| 4,450,944 | 5/1984 | Fujioka et al. | 192/70.12 |
| 4,458,793 | 7/1984 | Riese et al. | 192/70.12 |
| 4,473,144 | 9/1984 | Allori | 192/70.12 |
| 4,488,626 | 12/1984 | Handke | 192/70.12 |

FOREIGN PATENT DOCUMENTS 2148862  3/1973  France .
2398928  2/1979  France .
2001713  2/1979  United Kingdom .

Primary Examiner—George H. Krizmanich
Attorney, Agent, or Firm—Charles E. Brown; Charles A. Brown

[57] ABSTRACT

A multidisk clutch comprises an external bell member adapted to be coupled to a driving shaft and an internal ring member concentric with the bell member adapted to be coupled to a driven shaft. A plurality of disk members are disposed between the bell member and the ring member. Certain of these disk members are constrained to rotate with the bell member and the remainder with the ring member. A lubricating and cooling liquid is fed into the interior of the ring member, and can reach the disk members through a plurality of holes in the ring member. A generally annular scoop member is rotatably disposed within the ring member. It is constrained to rotate with the driving shaft and has a cylindrical peripheral wall disposed between the liquid feed means and the ring member. Its dimension in the axial direction is substantially the same as that of the ring member. The peripheral wall has passages in it through which the lubricating and cooling liquid is fed centrifugally to the disk members via the holes in the ring member.

11 Claims, 10 Drawing Figures

MULTIDISK CLUTCH FEATURING IMPROVED LUBRICATION AND COOLING

BACKGROUND OF THE INVENTION

1. Field of the Invention

The present invention relates to a multidisk clutch comprising an external bell member adapted to be coupled to a driving shaft, an internal ring member concentric with said bell member adapted to be coupled to a driven shaft, a plurality of disk members disposed between said bell member and said ring member certain of which are constrained to rotate with said bell member and the remainder of which are constrained to rotate with said ring member, means adapted to feed a lubricating and cooling liquid into the interior of said ring member, and a plurality of holes in said ring member whereby said liquid can reach said disk members.

2. Description of the Prior Art

Multidisk clutches of this type are generally satisfactory in operation, but the lubrication and cooling of the disk members sometimes leaves something to be desired. This shortcoming is due to the fact that the ring member coupled to the driven shaft does not rotate continuously, but rather only when the driven shaft is not stopped. If the driven shaft is stopped, the lubricating and cooling liquid flows downwards due to gravity, bathing only the lowermost part of the disk members.

An object of the present invention is a multidisk clutch of the type indicated hereinabove in which this shortcoming is eliminated and for which the lubricating and cooling conditions are considerably enhanced, by means of a simple, rugged and convenient structure.

SUMMARY OF THE INVENTION

The invention consists in a multidisk clutch comprising an external bell member adapted to be coupled to a driving shaft, an internal ring member concentric with said bell member adapted to be coupled to a driven shaft, a plurality of disk members disposed between said bell member and said ring member certain of which are constrained to rotate with said bell member and the remainder of which are constrained to rotate with said ring member, means adapted to feed a lubricating and cooling liquid into the interior of said ring member, a plurality of holes in said ring member whereby said liquid can reach said disk members, and a generally annular scoop member rotatably disposed within said ring member and constrained to rotate with said driving shaft, said scoop member having a cylindrical peripheral wall disposed between said liquid feed means and said ring member which has a dimension in the axial direction of the same order of magnitude as that of said ring member, and said peripheral wall having passages in it whereby said liquid from said liquid feed means is fed centrifugally to said disk members via said holes in said ring member.

Since the rotating scoop member is constrained to rotate with the driving shaft, it rotates continuously with the latter. It therefore acts continuously to irrigate the entire surface of the disk members, the uppermost part just as much as the lowermost part, whether the driven shaft is stopped or not. The benefit of this is the securing of excellent lubrication and cooling conditions under all circumstances. The scoop member is a light and simple part and thus does not complicate the construction of the clutch. Nor does it increase the size thereof since it is situated in an available space defined within the ring member.

The cylindrical peripheral wall may have a generally circular or possibly oval cross-section.

In one embodiment, the passages in the peripheral wall of the scoop member consist in a multiplicity of holes distributed over the entire surface of the wall, whereas in an alternative embodiment they consist in slots which are preferably axial. These slots are advantageously bordered by vanes which are either parallel or inclined to the axial direction. The vanes may project inwardly or outwardly relative to the peripheral wall of the scoop member.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Figures 1, 2:
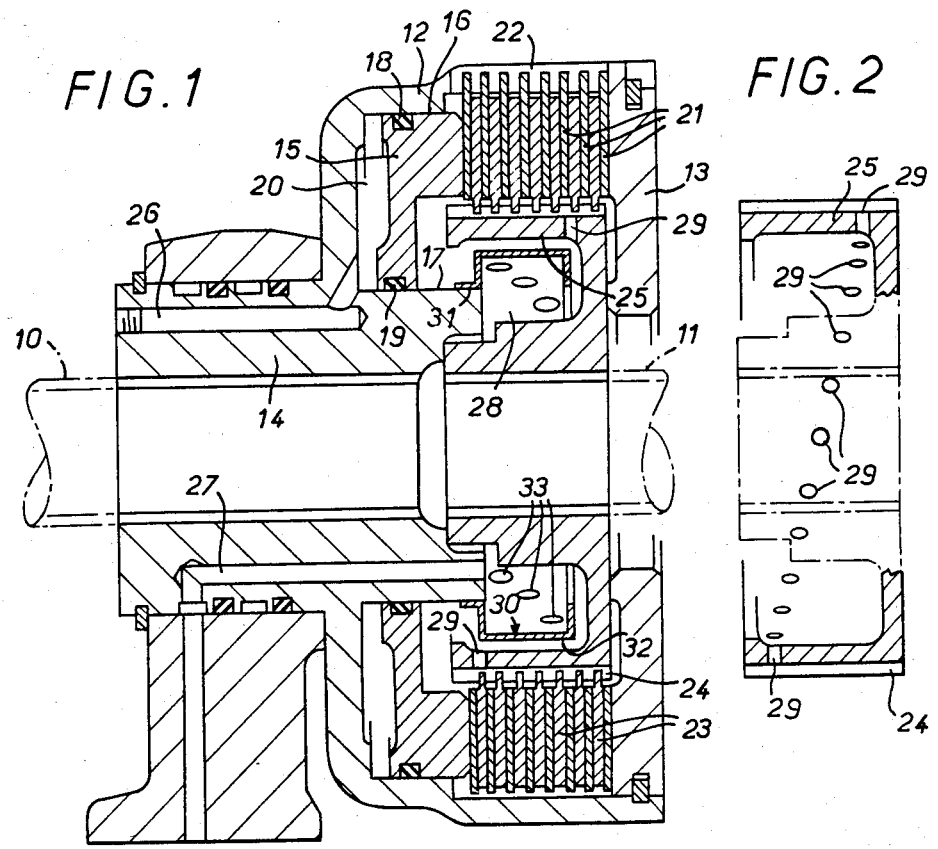
FIG. 1 is a view in longitudinal cross-section of a multidisk clutch in accordance with the invention.
FIG. 2 is a view of the ring member only, locally cut away.
Figures 3, 4:
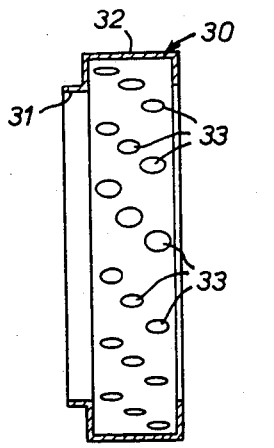
FIG. 3 is a view of the scoop member only.
FIG. 4 shows this scoop member in perspective.

The embodiment shown in FIGS. 1 through 4 is a non-limiting example of the application of the invention to a multidisk clutch for agricultural machinery, for example. FIG. 1 shows the driving shaft 10 which is coupled to the motor of the machine and the driven shaft 11.

The driven shaft 10 is rigidly attached to a bell member 12 having at its respective ends a closing plate 13 and a hub 14 whereby it is mounted on the shaft 10.

A piston 15 slides axially within a cylindrical inside bearing surface 16 of the bell member 12 and over a cylindrical outside bearing surface 17 of the hub 14. Seals 18 and 19 are provided to seal a chamber 20 which is delimited within the bell member 12 by the piston 15.

Disk members 21 slide axially within guides 22 on the bell member 12 and alternate with disk members 23 which slide axially on guides 24 formed on an internal ring member 25. The latter is mounted on the driven shaft 11.

The external bell member 12 and the internal ring member 25 are concentric and respectively coupled to the driving shaft 10 and the driven shaft 11. The various disk members 21 and 23 are accommodated between the external bell member 12 and the internal ring member 25.

The various disk members 21 and 23 are adapted to be clamped between the plate 13 forming a reaction plate and the piston 15 forming a pressure plate.

The clamping up of the disk members 21 and 23 in order to engage the clutch is achieved by pressurizing the chamber 20 by means of a conduit 26 formed in the hub 14 of the bell member 12 and connected to a hydraulic fluid source (not shown).

A lubricating and cooling liquid feed conduit 27 is also formed in the hub 14 of the bell member 12 and is adapted to feed the interior 28 of the ring member 25. The ring member 25 (see FIGS. 1 and 2) features a plurality of holes 29 to enable the lubricating and cooling liquid to reach the disk members 21 and 23.

In accordance with the invention, a generally annular rotating scoop member 30 (see FIGS. 1 through 4) is disposed in the interior 28 of the ring member 25. The scoop member 30 is constrained to rotate with the driving shaft 10 and in the example shown is attached to the hub 14 of the bell member 12 at 31.

The scoop member 30 has a cylindrical peripheral wall 32 (see FIGS. 3 and 4) disposed between the feed conduit 27 and the ring member 25. The axial dimension of the peripheral wall 32 is of the same order of magnitude as that of the ring member 25. The peripheral wall 32 features passages 33 for centrifugal feeding of the liquid issued from the conduit 27 towards the disk members 21 and 23 via the holes 29 in the ring member 25.

In the embodiment shown in FIGS. 1 through 4, the cylindrical peripheral wall 32 has a circular cross-section and the passages 33 in this wall 32 consist in a multiplicity of holes distributed over the entire surface of the wall 32.

By virtue of the arrangement which has just been described, the lubricating and cooling liquid fed from the conduit 21 into the interior 28 is continuously and centrifugally fed by the scoop member 30 since this is coupled to the driving shaft 10 which rotates continuously. Because of this, the liquid irrigates the entire surface of the disk members 21 and 23, lubricating and cooling them, whether the clutch is engaged or disengaged, that is to say whether the shaft 11 is rotating or stopped. In this way excellent lubricating and cooling conditions are achieved.

Figure 5:
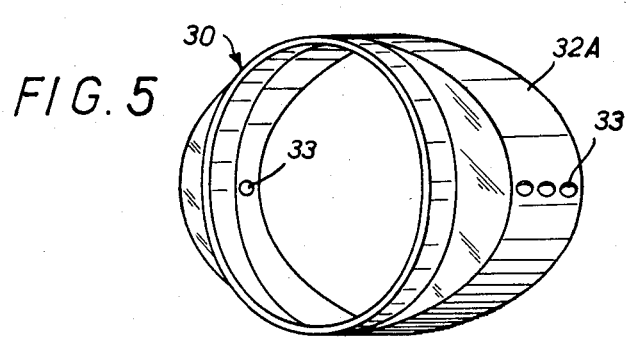
FIG. 5 is a view analogous to FIG. 4 but relating to an alternative embodiment in which the cylindrical wall of the scoop member has an oval rather than circular cross-section.

In an alternative embodiment (FIG. 5) the general arrangement is analogous to that which has just been described with reference to FIGS. 1 through 4 except that the cylindrical wall 32 of the scoop member 30, designated 32A, is of elliptical rather than circular cross-section. Two series of holes disposed in line with the maximum dimension of the cylindrical wall 32A, one of which is seen at 33, feed the cooling liquid centrifugally.

The oval shape of the wall 32A introduces an additional centrifugal effect in respect of the liquid which reaches the disk members 21 and 23.

In another alternative embodiment (FIGS. 6 and 7) the passages in the peripheral wall 32 of the scoop member 30 consist of axial slots 33. These slots are bordered by vanes 34 which are parallel to the axial direction.

Figure 8:
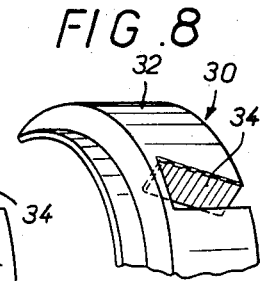
FIG. 8 is a partial view analogous to FIG. 7 but relating to a further alternative embodiment in which the vanes are inclined rather than parallel to the axial direction.

In the alternative embodiment shown in FIG. 8, the vanes 34 are inclined rather than parallel to the axial direction, in order to improve the conditions under which the disk members 21 and 23 are irrigated.

Figure 6:
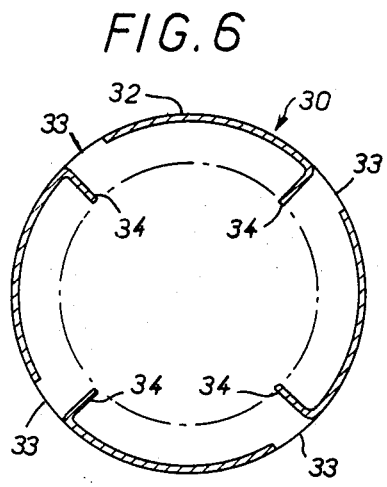
FIG. 6 concerns another alternative scoop member embodiment shown in transverse cross-section, this scoop member having slots and inwardly directed vanes.
Figure 7:
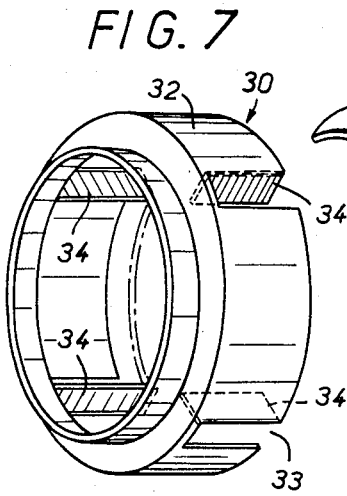
FIG. 7 is a corresponding view of this scoop member in perspective.
Figure 9:
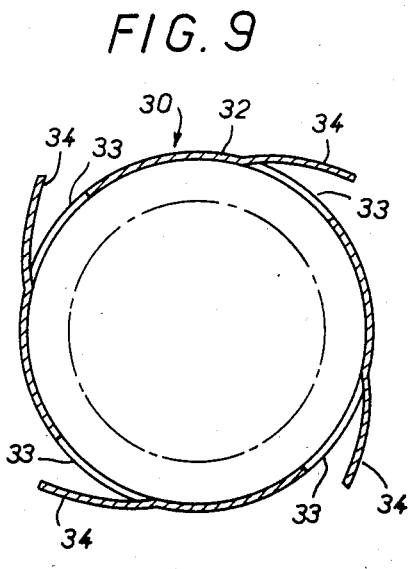
FIG. 9 is a view in transverse cross-section of another alternative embodiment of the scoop member in which the vanes are outwardly directed.
Figure 10:
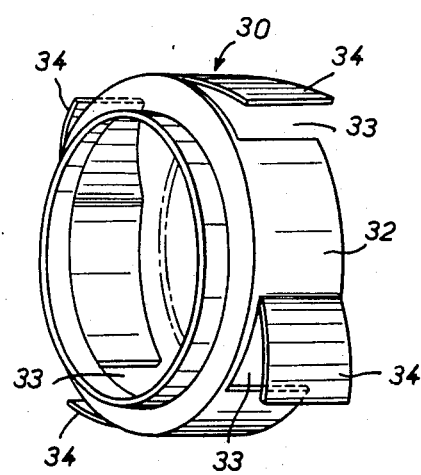
FIG. 10 is a corresponding perspective view.

In the alternative embodiment shown in FIGS. 9 and 10, the general arrangement is analogous to that which has just been described with reference to FIGS. 6 and 7 except that whereas in the latter figures the vanes 34 project inwardly relative to the peripheral wall 32 of the scoop member 30, in FIGS. 9 and 10 they project outwardly from the wall 30. In all cases excellent lubrication and cooling of the disk members 21 and 23 are obtained under all circumstances.

It will be understood that various changes in the details, materials and arrangements or parts which have been herein described and illustrated in order to explain the nature of the invention may be made by those skilled in the art within the principle and scope of the invention as expressed in the appended claims.

I claim:

1. Multidisk clutch comprising an external bell member adapted to be coupled to a driving shaft, an internal ring member concentric with said bell member and being adapted to be coupled to a driven shaft, a plurality of disk members disposed between said bell member and said ring member with certain of said disk members being constrained to rotate with said bell member and the remainder of said disk members being constrained to rotate with said ring member, liquid feed means adapted to feed a lubricating and cooling liquid into the interior of said ring member, a plurality of holes in said ring member for supplying said liquid to said disks, and a generally annular scoop member separate and distinct from and rotatably disposed within said ring member, said scoop member being constrained to rotate with a driving shaft relative to said ring member when said clutch is disengaged, said scoop member having a cylindrical peripheral wall disposed between said liquid feed means and said ring member, said peripheral wall having a dimension in the axial direction of the same order of magnitude as that of said ring member, and said peripheral wall having passages in it whereby liquid from said liquid feed means is fed centrifugally to said disk members via said holes in said ring member.

2. Multidisk clutch according to claim 1, wherein said cylindrical wall is of circular cross-section.

3. Multidisk clutch according to claim 1, wherein said passages in said peripheral wall of said scoop member comprises a multiplicity of holes distributed over the entire surface of said wall.

4. Multidisk clutch according to claim 1, wherein said cylindrical wall is of oval cross-section.

5. Multidisk clutch according to claim 4, wherein said passages are holes disposed at the location of the maximum dimension of said oval cross-section cylindrical wall.

6. Multidisk clutch according to claim 1, wherein said passages in said peripheral wall of said scoop member consist in axial slots.

7. Multidisk clutch according to claim 6, wherein said slots are bordered by vanes.

8. Multidisk clutch according to claim 7, wherein said vanes are parallel to the axial direction.

9. Multidisk clutch according to claim 7, wherein said vanes are inclined to the axial direction.

10. Multidisk clutch according to claim 7, wherein said vanes project inwardly from said peripheral wall of said scoop member.

11. Multidisk clutch according to claim 7, wherein said vanes project outwardly from said peripheral wall of said scoop member.

* * * * *